(12) United States Patent
Kawakami et al.

(10) Patent No.: US 7,382,783 B2
(45) Date of Patent: Jun. 3, 2008

(54) MULTIPLEX TRANSMISSION APPARATUS AND MULTIPLEX TRANSMISSION METHOD FOR ENCAPSULATING DATA WITHIN A CONNECTIONLESS PAYLOAD

(75) Inventors: Hiroshi Kawakami, Yokosuka (JP); Ichiro Hayashi, Kashiwa (JP); Fumiaki Ishino, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 1040 days.

(21) Appl. No.: 10/228,137

(22) Filed: Aug. 27, 2002

(65) Prior Publication Data
US 2003/0043809 A1    Mar. 6, 2003

(30) Foreign Application Priority Data
Aug. 28, 2001  (JP)  ............................. 2001-258582

(51) Int. Cl.
H04L 12/56  (2006.01)
(52) U.S. Cl. ............................. 370/395.52; 370/395.6; 370/466
(58) Field of Classification Search ........ 370/352–355, 370/395.1, 395.5, 395.52, 401, 465, 466, 370/469, 395.6
See application file for complete search history.

(56) References Cited

U.S. PATENT DOCUMENTS

| | | | | |
|---|---|---|---|---|
| 5,408,472 A | * | 4/1995 | Hluchyj et al. | ............. 370/416 |
| 6,021,263 A | * | 2/2000 | Kujoory et al. | ............. 709/232 |
| 6,041,054 A | * | 3/2000 | Westberg | ................... 370/389 |
| 6,219,339 B1 | * | 4/2001 | Doshi et al. | ................. 370/235 |
| 6,385,170 B1 | * | 5/2002 | Chiu et al. | ................... 370/235 |
| 6,430,154 B1 | * | 8/2002 | Hunt et al. | .............. 370/230.1 |
| 6,654,376 B1 | * | 11/2003 | Stacey et al. | .......... 370/395.21 |
| 6,757,249 B1 | * | 6/2004 | Kejriwal et al. | ......... 370/235.1 |

(Continued)

FOREIGN PATENT DOCUMENTS

EP        0 892 576        1/1999

(Continued)

OTHER PUBLICATIONS

Tanaka, J. et al., "QoS Interworking for Diffserv Over ATM Access Networks," IEEE Global Telecommunications Conference, GLOBECOM '00. Nov.-Dec. 2000. vol. 3. pp. 1560-1564.*

(Continued)

*Primary Examiner*—Chi Pham
*Assistant Examiner*—Donald L Mills
(74) *Attorney, Agent, or Firm*—Oblon, Spivak, McClelland, Maier & Neustadt, P.C.

(57) ABSTRACT

A multiplex transmission apparatus is provided that conducts traffic control and discards priority control of an ATM network for transferring IP packets having a plurality of QoS conditions. The multiplex transmission apparatus includes an intermediately generated packet generator configured to generate an intermediately generated packet having second header information "CID" based on first header information "DSCP" of the IP packet, a buffer storage configured to store the intermediately generated packet in any of transmission waiting buffers based on the second header information "CID", an extractor configured to extract out the intermediately generated packet from the transmission waiting buffers according to the second header information "CID", and an ATM cell transmitter configured to load an ATM cell with the intermediately generated packet taken out and transmitting the ATM cell to the ATM network.

13 Claims, 9 Drawing Sheets

U.S. PATENT DOCUMENTS

| | | | |
|---|---|---|---|
| 6,940,862 B2 * | 9/2005 | Goudreau | 370/395.52 |
| 7,088,724 B2 * | 8/2006 | Yamanaka | 370/395.52 |
| 2001/0005381 A1 * | 6/2001 | Sugiyama | 370/466 |
| 2001/0007560 A1 * | 7/2001 | Masuda et al. | 370/401 |

FOREIGN PATENT DOCUMENTS

| | | |
|---|---|---|
| EP | 0 967 756 | 12/1999 |
| JP | 3016400 | 12/1999 |
| WO | WO 0030401 A1 * | 5/2000 |

OTHER PUBLICATIONS

Rabbat, R. et al., "Supporting Differentiated Services Using ATM ABR Service," Eight International Conference on Computer Communications and Networks, 1999. Oct. 1999. pp. 210-213.*

T. Ishihara, et al., IEICE Trans. Communications, vol. E84-B, No. 6, XP-001065919, pp. 1498-1503, "Diffserv-Based QoS Over ATM Access Networks", Jun. 6, 2001.

* cited by examiner

FIG.3

| CID | LI | UUI | HEC | DATA |
|-----|----|----|-----|------|

CPS PACKET HEADER (CID, LI, UUI, HEC) — CPS PACKET PAYLOAD (DATA)

FIG.4

| DSCP | CID |
|------|-----|
| 001010 | 1 |
| 010010 | 2 |
| 011010 | 3 |
| 100010 | 4 |
| 001100 | 5 |
| 010100 | 6 |
| 011100 | 7 |
| 100100 | 8 |
| 001110 | 9 |
| 010110 | 10 |
| 011110 | 11 |
| 100110 | 12 |

FIG.5

| CID | QoS CLASS |
|---|---|
| 1 | 1 |
| 2 | 2 |
| 3 | 3 |
| 4 | 4 |
| 5 | 1 |
| 6 | 2 |
| 7 | 3 |
| 8 | 4 |
| 9 | 1 |
| 10 | 2 |
| 11 | 3 |
| 12 | 4 |

FIG.6

| CID | DISCARD PRIORITY | THRESHOLD |
|---|---|---|
| 1~4 | 1 | 10 |
| 5~8 | 2 | 20 |
| 9~12 | 3 | 30 |

FIG.9

| CID | VCI | QoS CLASS |
|-----|-----|-----------|
| 1   | 1   | 1         |
| 2   | 2   | 2         |
| 3   | 3   | 3         |
| 4   | 4   | 4         |
| 5   | 1   | 1         |
| 6   | 2   | 2         |
| 7   | 3   | 3         |
| 8   | 4   | 4         |
| 9   | 1   | 1         |
| 10  | 2   | 2         |
| 11  | 3   | 3         |
| 12  | 4   | 4         |

FIG.10

| GFC | VPI | VCI | PT | CLP | HEC | DATA |

ATM CELL HEADER — ATM CELL PAYLOAD

FIG.11

| CID | CLP | THRESHOLD |
|---|---|---|
| 1~4 | 0 | 10 |
| 5~8 | 1 | 20 |
| 9~12 | 1 | 20 |

MULTIPLEX TRANSMISSION APPARATUS AND MULTIPLEX TRANSMISSION METHOD FOR ENCAPSULATING DATA WITHIN A CONNECTIONLESS PAYLOAD

CROSS REFERENCE TO RELATED APPLICATIONS

This application is based upon and claims the benefit of priority from the prior Japanese Patent Applications No. P2001-258582, filed on 28 Aug.; 2001, the entire contents of which are incorporated herein by reference.

BACKGROUND OF THE INVENTION

1. Field of the Invention

The present invention relates to a multiplex transmission apparatus and a multiplex transmission method for ATM (Asynchronous Transfer Mode) communication.

2. Description of the Related Art

Conventionally, the traffic control method in the ATM network is conducted according to a service category of a VC (Virtual Channel) connection defined in an ATM layer. For example, as this service category, CBR (Constant Bit Rate), VBR (Variable Bit Rate), ABR (Available Bit Rate), UBR (Unspecified Bit Rate), and GFR (Guaranteed Bit Rate) are defined.

In the conventional traffic control method in the ATM network, a QoS (Quality of Service) condition requested by the user is satisfied by controlling traffic so as to satisfy the "QoS condition" of each service category. The service category of a VC connection is determined according to the traffic characteristic and the QoS request at the time of VC connection setting.

Typically, when transferring IP (Internet Protocol) packets, the ATM network transfers IP packets of a plurality of destinations on a single VC connection.

In the conventional traffic control method in the ATM network, however, a plurality of QoS conditions cannot be set in a single VC connection. When transferring IP packets having a plurality of QoS conditions set therein in the conventional ATM network, therefore, it is necessary to prepare as many VC connections as the number of QoS conditions set. In the conventional ATM network, therefore, there is a problem in that the number of VC connections increases and a limit is imposed on the ATM network construction condition.

In order to solve the problem, the following traffic control methods are known.

As a first traffic control method, there is known a method in which an ATM network uses a Diffserv (Differentiated Services) system, which is a QoS control technique in IP communication, when transferring IP packets having a plurality of QoS conditions set therein.

In the Diffserv system, the QoS condition of each IP packet is set in the IP packet header by "DSCP (Diffserv Code Point) information". In the Diffserv system, processing on IP packets is conducted according to the DSCP every IP packet switching apparatus (router, switch, or the like). This processing of IP packets is called "PHB (Per Hop Behavior)".

In the Diffserv system, PHB, such as EF (Expedited Forwarding), AF (Assured Forwarding), or Default, is defined by the DSCP.

As a second traffic control method, there is conceivable a method in which an ATM network uses an "AAL2 (ATM Adaptation Layer Type 2)" system in an upper layer above an ATM layer, when transferring IP packets having a plurality of QoS conditions set therein.

The AAL2 system aims at multiplexing a plurality of user connections on a single VC connection by using a frame that is shorter than an ATM cell of high efficiency coded audio information or the like.

As for an AAL2 connection used in the AAL2 system, it is possible to ensure a communication bandwidth with signaling. Furthermore, in the AAL2 system, it is possible to set a plurality of QoS conditions for each AAL2 connection. A technique of setting a plurality of Qos conditions in the AAL2 connection level is disclosed in Japanese Patent No. 3016400.

In the above described first traffic control method, however, a discard priority indication capability (three kinds can be set in AF PHB) in the Diffserv system is different from a discard priority indication capability (two kinds can be set by CLP (Cell Loss Priority)) in the ATM layer. This results in a problem in that it is necessary to convert the discard priority indication capability in the Diffserv system to the discard priority indication capability in the ATM layer, which is a lower indication capability.

Furthermore, in the AAL2 system, it is not supposed to conduct a traffic control that satisfies the QoS condition set in the IP network. Therefore, the above described second traffic control method has a problem that the traffic control and discard priority control using CLP per ATM cell can be conducted, but traffic control and discard priority control per CPS (Commonpart Sublayer) packet cannot be conducted.

BRIEF SUMMARY OF THE INVENTION

An object of the present invention is to provide a multiplex transmission apparatus and a multiplex transmission method that make it possible to conduct a traffic control and a discard priority control corresponding to the Diffserv system when transferring IP packets having a plurality of QoS conditions set therein in an ATM network.

According to a first feature of the present invention, a multiplex transmission apparatus implemented to load an ATM cell with an IP packet and transmit the ATM cell to an ATM network comprises an intermediately generated packet generator implemented, depending on first header information of the IP packet, to generate an intermediately generated packet having second header information, a buffer storage implemented, depending on the second header information, to store the intermediately generated packet in one of a plurality of transmission waiting buffers, a extractor implemented, depending on the second header information, to extract the intermediately generated packet from the transmission waiting buffer, and an ATM cell transmitter implemented to load the ATM cell with the intermediately generated packet extracted and transmit the ATM cell to the ATM network.

Preferably, in the first feature of the present invention, a multiplex transmission apparatus comprises a discarder implemented, as an amount of the intermediately generated packets stored in the transmission waiting buffer exceeds a predetermined amount, to conduct a discard control on the intermediately generated packets depending on the second header information.

According to a second feature of the present invention, a multiplex transmission apparatus implemented to load an ATM cell with an IP packet and transmit the ATM cell to an ATM network comprises an intermediately generated packet generator implemented, depending on first header information of the IP packet, to generate an intermediately generated packet having second header information, an ATM cell generator implemented to load the ATM cell with the intermediately generated packet, a buffer storage implemented, depending on third header information of the ATM cell, to store the ATM cell in one of a plurality of transmission waiting buffers, a extractor implemented, depending on the third header information of the ATM cell, to extract the ATM cell from the transmission waiting buffer, and an ATM cell transmitter implemented to transmit the ATM cell extracted, to the ATM network.

Preferably, in the second feature of the present invention, a multiplex transmission apparatus comprises a discarder implemented, as an amount of the ATM cells stored in the transmission waiting buffer exceeds a predetermined amount, to conduct a discard control on the ATM cells depending on fourth header information of the ATM cell.

Preferably, in the second feature of the present invention, an ATM cell generator loads the ATM cell with one intermediately generated packet.

Preferably, in the second feature of the present invention, an ATM cell generator loads the ATM cell with the intermediately generated packets having the same second header information.

According to a third feature of the present invention, a multiplex transmission method of loading an ATM cell with an IP packet and transmitting the ATM cell to an ATM network comprises the steps of: A) generating, depending on first header information of the IP packet, an intermediately generated packet having second header information, B) storing, depending on the second header information, the intermediately generated packet in one of a plurality of transmission waiting buffers, C) extracting, depending on the second header information, the intermediately generated packet from the transmission waiting buffer, and D) loading the ATM cell with the intermediately generated packet extracted and transmitting the ATM cell to the ATM network.

Preferably, in the third feature of the present invention, a multiplex transmission method comprises the step of E) conducting a discard control on the intermediately generated packets depending on the second header information, as an amount of the intermediately generated packets stored in the transmission waiting buffer exceeds a predetermined amount.

According to a fourth feature of the present invention, a multiplex transmission method of loading an ATM cell with an IP packet and transmitting the ATM cell to an ATM network comprises the steps of A) generating, depending on first header information of the IP packet, an intermediately generated packet having second header information, B) loading the ATM cell with the intermediately generated packet, C) storing, depending on third header information of the ATM cell, the ATM cell in one of a plurality of transmission waiting buffers, D) extracting, depending on the third header information of the ATM cell, the ATM cell from the transmission waiting buffer, and E) transmitting the ATM cell extracted, to the ATM network.

Preferably, in the fourth feature of the present invention, a multiplex transmission method comprises the step of F) conducting a discard control on the ATM cells depending on fourth header information of the ATM cell, as an amount of the ATM cells stored in the transmission waiting buffer exceeds a predetermined amount.

Preferably, in the fourth feature of the present invention, in the step B), the ATM cell is loaded with one intermediately generated packet.

Preferably, in the fourth feature of the present invention, in the step B), the ATM cell is loaded with the intermediately generated packets having the same second header information.

BRIEF DESCRIPTION OF THE DRAWINGS

FIG. 3 is a diagram showing a configuration of a CPS packet.

FIG. 4 is a diagram showing an example of a table used by a CPS packet generator of a multiplex transmission apparatus according to an embodiment of the present invention.

FIG. 5 is a diagram showing an example of a table used by a QoS distributor of a multiplex transmission apparatus according to an embodiment of the present invention.

FIG. 6 is a diagram showing an example of a table used by a priority discard controller of a multiplex transmission apparatus according to an embodiment of the present invention.

FIG. 9 is a diagram showing an example of a table used by an ATM cell generator and a QoS distributor of a multiplex transmission apparatus according to an embodiment of the present invention.

FIG. 10 is a diagram showing a configuration of an ATM cell;

FIG. 11 is a diagram showing an example of a table used by a priority discard controller of a multiplex transmission apparatus according to an embodiment of the present invention.

DETAILED DESCRIPTION OF THE INVENTION (Configuration of Multiplex Transmission Apparatus According to First Embodiment of Present Invention)

Figure 1:
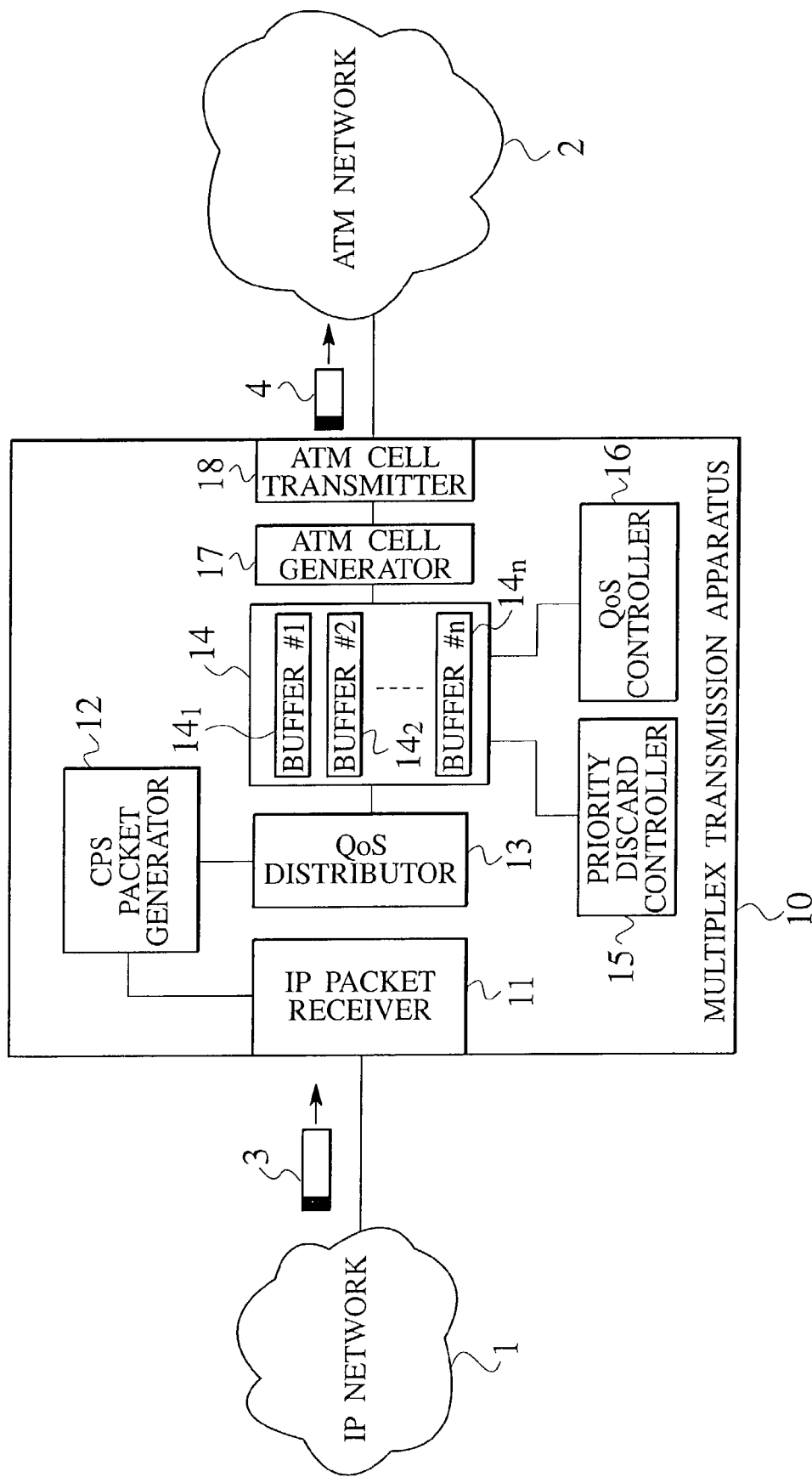
FIG. 1 is a schematic configuration diagram of a multiplex transmission apparatus according to an embodiment of the present invention.

A configuration of a multiplex transmission apparatus according to a first embodiment of the present invention will now be described with reference to the drawings. FIG. 1 is a diagram showing a network configuration in which an IP network 1 and an ATM network 2 are connected to each other via a multiplex transmission apparatus 10.

The multiplex transmission apparatus 10 according to the present embodiment loads an ATM cell 4 with an IP packet 3 transmitted from the IP network 1, and transmits the ATM cell 4 to the ATM network 2.

As shown in FIG. 1, the multiplex transmission apparatus 10 according to the present embodiment includes an IP packet receiver 11, a CPS packet generator 12, a QoS distributor 13, a buffer 14, a priority discard controller 15, a QoS controller 16, an ATM cell generator 17, and an ATM cell transmitter 18.

The IP packet receiver 11 is connected to the CPS packet generator 12. The IP packet receiver 11 receives the IP packet 3 transmitted from the IP network 1, and transfers the received IP packet 3 to the CPS packet generator 12.

Figure 2:
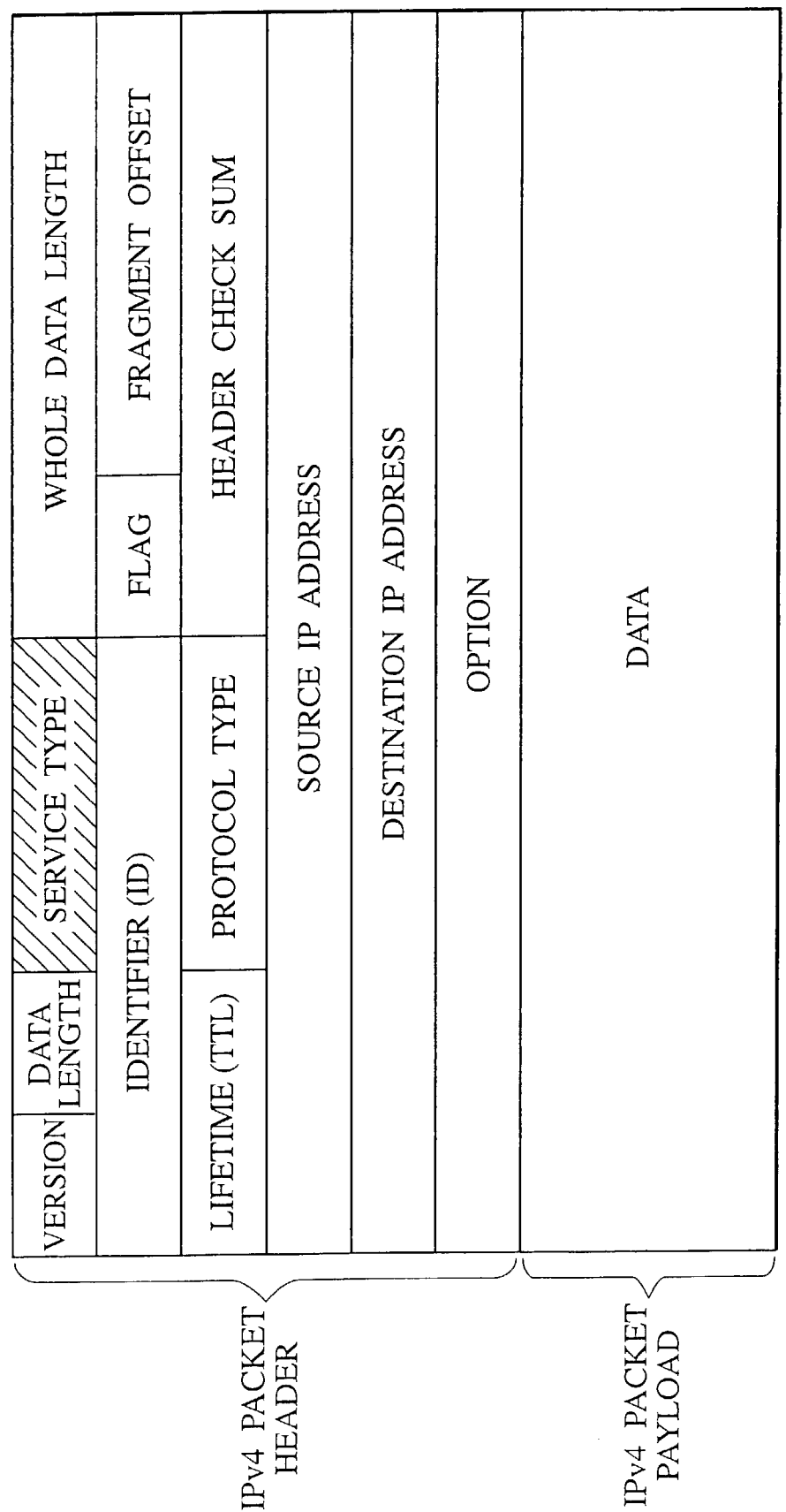
FIG. 2 is a diagram showing a configuration of an IP packet (IPv4).

FIG. 2 shows a configuration of the IP packet 3 received by the IP packet receiver 11. In the present embodiment, an IP packet that conforms to IPv4 (IP Version 4) will be described. However, a multiplex transmission apparatus according to the present invention can also be applied to the case where an IP packet that conforms to IPv6 (IP Version 6) is used.

A "version" field has 4 bits, and indicates a version number (IPv4 or IPv6) of an IP protocol.

A "data length" field has 4 bits, and indicates a size of an IP packet header.

A "service type" field has 6 bits, and indicates information concerning the service quality (QoS) requested by an IP packet.

A "whole data length" field has 16 bits, and indicates the whole length of the IP packet header and an IP packet payload collectively.

An "identifier (ID)" field has 16 bits, and indicates identification information used for an upper layer to distinguish each IP packet.

A "flag" field has 3 bits, and indicates information concerning fragment (division) of an IP packet. The fragment means dividing a long IP packet and transferring the divided parts.

A "fragment offset" field has 13 bits, and indicates a location of each fragment in original data.

A "lifetime (TTL)" field has 8 bits, and indicates time during which existence of an IP packet in the IP network 1 is allowed.

A "protocol type" field has 8 bits, and indicates a protocol kind of an upper layer.

A "header check sum" field has 16 bits, and indicates information for conducting a detection check of a transfer error in a header of an IP packet.

A "source IP address" field has 32 bits, and indicates an IP address of a source terminal. A "destination IP address" field has 32 bits, and indicates an IP address of a destination terminal.

An "option" field is not usually used.

The CPS packet generator 12 is connected to the IP packet receiver 11 and the QoS distributor 13. The CPS packet generator 12 generates a CPS packet depending on an IP packet 3 transferred from the IP packet receiver 11, and transmits the generated CPS packet to the QoS distributor 13.

FIG. 3 shows a configuration of a CPS packet generated by the CPS packet generator 12. The CPS packet is an intermediately generated packet of a unit multiplexed onto the VC connection in the AAL2 system.

A "CID (Channel Identifier)" field has 8 bits, and indicates identification information for identifying an AAL2 connection. An "LI" field has 6 bits, and indicates a CPS packet payload length.

A "UUI (User-to-User Interface)" field has 5 bits, and indicates information concerning division of a SDU (service data unit) processed in the upper layer. An "HEC" field is an error correction field having 5 bits.

To be more specific, depending on the "DSCP" set in the "service type" field of the IP packet 3, the CPS packet generator 12 determines a "CID" corresponding to the "DSCP" and generates a CPS packet in which the determined "CID" is set in the "CID" field.

The CPS packet generator 12 refers to a table that associates the "DSCP" with the "CID" when determining the "CID". An example of the table is shown in FIG. 4.

In other words, the CPS packet generator 12 is intermediately generated packet generator implemented, depending on first header information of the IP packet 3, to generate an intermediately generated packet (CPS packet) having second header information. Here, the first header information is the "DSCP" and the second header information is the "CID."

In IP packets conforming to the IPv4, the "DSCP" is set in 6 high-order bits of the "service type" field. In IP packets conforming to the IPv6, the "DSCP" is set in 6high-order bits of a "Traffic_Class" field.

The QoS distributor 13 is connected to the CPS packet generator 12 and the buffer 14. The QoS distributor 13 determines a "QoS class" depending on the "CID" set in the CPS packet generated by the CPS packet generator 12, and distributes the CPS packet among buffers $14_1$ to $14_n$, respectively prepared for "QoS classes", depending on the determined "QoS class."

The QoS distributor 13 refers to a table that associates the "CID" with the "QoS class" when determining the "QoS class." An example of the table is shown in FIG. 5.

In other words, the QoS distributor 13 is buffer storage implemented, depending on the second header information (CID), to store the intermediately generated packet (CPS packet) in one of a plurality of buffers $14_1$ to $14_n$.

The buffer 14 is connected to the QoS distributor 13, the priority discard controller 15, the QoS controller 16 and the ATM cell generator 17. The buffer 14 is a transmission waiting buffer including buffers $14_1$ to $14_n$ for storing CPS packets of respective "QoS classes."

For example, the buffer $14_1$ stores a CPS packet having a "QoS class" of "1" distributed by the QoS controller 13.

The priority discard controller 15 is connected to the buffer 14. The priority discard controller 15 monitors the number of CPS packets or the amount of data stored in the buffers $14_1$ to $14_n$. When the number of CPS packets or the amount of data has exceeded a threshold, the priority discard controller 15 effects a control so as to preferentially discard CPS packets stored in the pertinent buffer included in the buffers $14_1$ to $14_n$.

The priority discard controller 15 can set the "discard priorities" of respective CPS packets depending on the "CID" and set a different threshold for each "discard priority." At this time, the priority discard controller 15 refers to a table that associates the "CID" with the "discard priority" and "threshold." An example of the table is shown in FIG. 6.

For example, when the number of CPS packets stored in the buffer $14_1$ has exceeded "10" (or when the data amount has exceeded 10 kbytes), the priority discard controller 15 conducts a discard control so as to discard CPS packets in which the "CID" is in the range of "1 to 4" (i.e., CPS packets in which the "discard priority" is "1.")

Furthermore, when the number of CPS packets stored in the buffer $14_1$ has exceeded "20" (or when the data amount has exceeded 20 kbytes), the priority discard controller 15 conducts a discard control so as to discard CPS packets in which the "CID" is in the range of "1 to 4" (i.e., CPS packets in which the "discard priority" is "1") and CPS packets in which the "CID" is in the range of "5 to 8" (i.e., CPS packets in which the "discard priority" is "2").

In addition, when the number of CPS packets stored in the buffer 141 has exceeded "30" (or when the data amount has exceeded 30 kbytes), the priority discard controller 15 conducts a discard control so as to discard CPS packets in which the "CID" is in the range of "1 to 4" (i.e., CPS packets in which the "discard priority" is "1"), CPS packets in which the "CID" is in the range of "5 to 8" (i.e., CPS packets in which the "discard priority" is "2"), and CPS packets in which the "CID" is in the range of "9 to 12" (i.e., CPS packets in which the "discard priority" is "3").

In other words, the priority discard controller 15 is discarder implemented, as an amount of intermediately generated packets (CPS packets) stored in the buffers $14_1$ to $14_n$ exceeds a predetermined amount (a threshold concerning the number of packets or the packet data amount), to conduct a discard control on intermediately generated packets (CPS packets) depending on the second header information (CID).

The QoS controller 16 is connected to the buffer 14. The QoS controller 16, in an order according to QoS conditions that are set by using the "QoS classes" respectively associated with the buffers $14_1$ to $14_n$, extracts CPS packets from the buffers $14_1$ to $14_n$ into the ATM cell generator 17.

The order in which the QoS controller 16 extracts CPS packets may correspond to the order of priority set for each "QoS class" or may be subject to scheduling control conducted so as to secure a communication bandwidth set for each "QoS class."

In other words, the QoS controller 16 is extractor implemented, depending on the QoS class, to extract intermediately generated packets (CPS packets) from the buffers $14_1$ to $14_n$.

The ATM cell generator 17 is connected to the buffer 14 and the ATM cell transmitter 18. The ATM cell generator 17 generates an ATM cell 4 by loading an ATM cell payload with a CPS packet extracted from the buffer 14, and transmits the generated ATM cell 4 to the ATM cell transmitter 18.

The ATM cell transmitter 18 is connected to the ATM cell generator 17. The ATM cell transmitter 18 transfers the ATM cell 4 transmitted from the ATM cell generator 17 to the ATM network 2 on the VC connection.

In other words, the ATM cell generator 17 and the ATM cell transmitter 18 form an ATM cell transmitter implemented to load the ATM cell 4 with the intermediately generated packet (CPS) extracted, and transmit the ATM cell 4 to the ATM network 2.

The QoS controller 16 successively extracts only CPS packets that generate ATM cells 4 which can be transmitted to the ATM network 2. As a result, it is possible to minimize the delay in the ATM cell transmitter 18 and prevent the communication quality from being degraded.

(Operation of Multiplex Transmission Apparatus According to First Embodiment)

Figure 7:
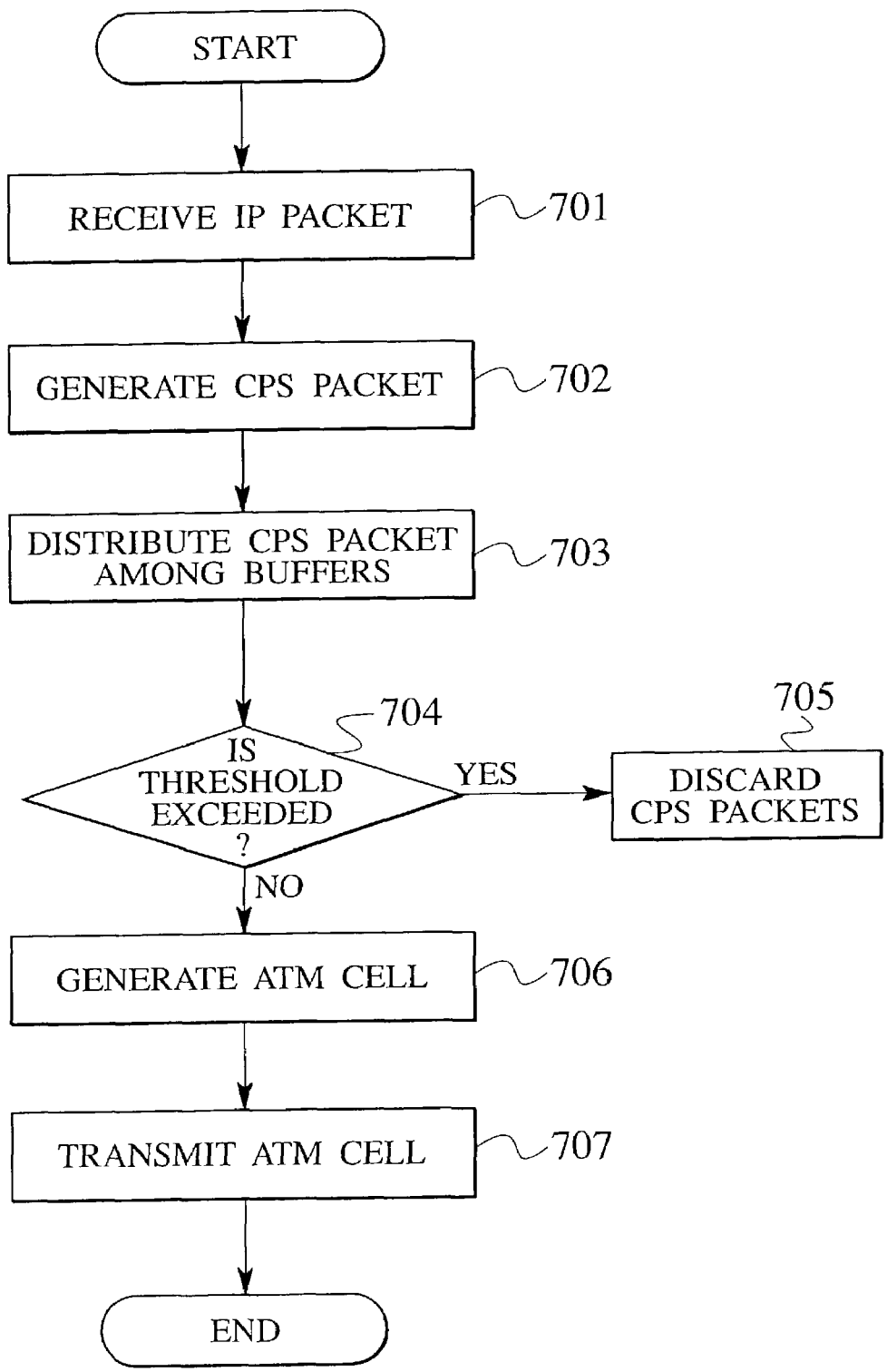
FIG. 7 is a flow chart showing an operation conducted when a multiplex transmission apparatus according to an embodiment of the present invention transfers an IP packet transmitted from an IP network, to an ATM network.

Operation of the multiplex transmission apparatus 10 having the above described configuration will now be described with reference to FIG. 7. FIG. 7 is a flow chart showing an operation conducted when the multiplex transmission apparatus 10 transfers an IP packet transmitted from the IP network 1, to the ATM network 2.

As shown in FIG. 7, the IP packet receiver 11 receives an IP packet 3 transmitted from the IP network 1 at step 701.

At step 702, the CPS packet generator 12 refers to the table shown in FIG. 4 depending on a "DSCP" set in the "service type" field of the IP packet 3, and generates a CPS packet having a "CID" corresponding to the "DSCP" set in its "CID" field.

At step 703, the QoS distributor 13 refers to the table shown in FIG. 5 depending on the "CID" set in the CPS packet generated by the CPS packet generator 12, and determines a "QoS class" corresponding to the "CID."

Depending on the determined "QoS class", the QoS distributor 13 distributes the CPS packet among the buffers 141 to 14n respectively prepared for "QoS classes."

At step 704, the priority discard controller 15 refers to the table shown in FIG. 6 when the CPS packet is distributed among the buffers $14_1$ to $14_n$, and effects monitoring to determine whether the number of CPS packets or data amount exceeds a threshold of each "discard priority" for each of the buffers $14_1$ to $14_n$.

If as a result of this monitoring the number of CPS packets or the data amount is judged to have exceeded the threshold, then at step 705 the priority discard controller 15 preferentially discards CPS packets of the "discard priority" stored in the pertinent buffer included in the buffers $14_1$ to 14n.

If the number of CPS packets or the data amount is judged not to have exceeded the threshold, then the QoS controller 16, in an order according to QoS conditions that are set by using the "QoS classes" respectively associated with the buffers $14_1$ to $14_n$, extracts CPS packets from the buffers $14_1$ to 14n into the ATM cell generator 17.

At step 705, the ATM cell generator 17 generates an ATM cell 4 by loading an ATM cell payload with the CPS packet extracted from the buffer 14, and transmits the generated ATM cell 4 to the ATM cell transmitter 18.

At step 706, the ATM cell transmitter 18 transfers the ATM cell 4 transmitted from the ATM cell generator 17 to the ATM network 2 on the VC connection.

(Action and Effects of Multiplex Transmission Apparatus According to First Embodiment)

According to the multiplex transmission apparatus of the first embodiment, the CPS packet generator 12 generates, depending on the "DSCP" (first header information) of the IP packet 3, a CPS packet (intermediately generated packet) having a different "CID" (second header information). The ATM cell generator 17 loads an ATM cell 4 with the generated CPS packet (intermediately generated packet). In the ATM network 2, therefore, it is possible to conduct a traffic control according to the QoS condition set in the IP packet 3.

Furthermore, according to the multiplex transmission apparatus of the first embodiment, the priority discard controller 15 conducts a discard control according to the "CID" (second header information) generated based on the "DSCP" (first header information) of the IP packet 3. In the ATM network 2, therefore, it is possible to conduct a discard priority control according to the QoS condition set in the IP packet 3.

(Configuration of Multiplex Transmission Apparatus According to Second Embodiment of Present Invention)

Figure 8:
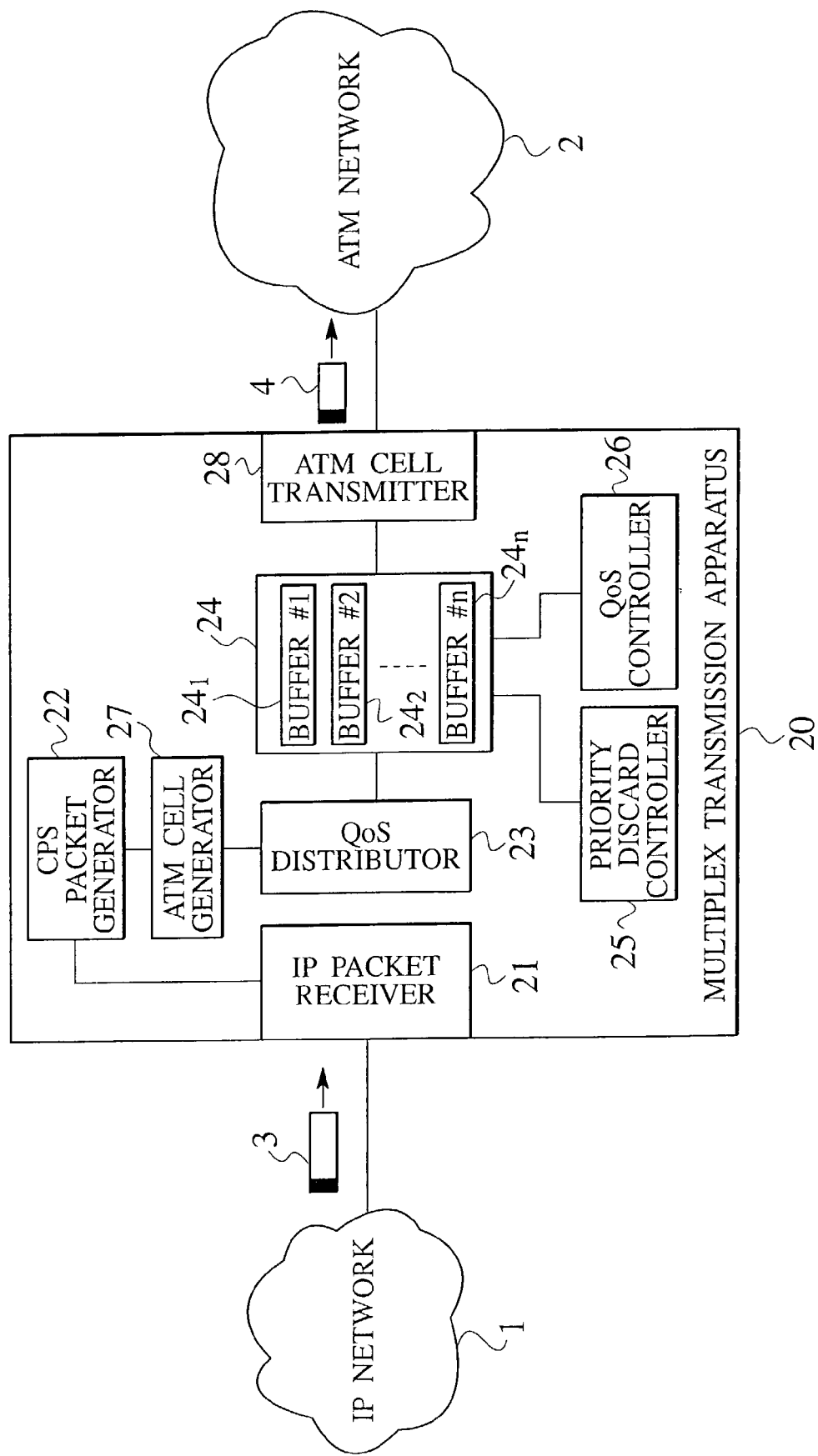
FIG. 8 is a schematic configuration diagram of a multiplex transmission apparatus according to an embodiment of the present invention.

A configuration of a multiplex transmission apparatus according to a second embodiment of the present invention will now be described with reference to the drawings. FIG. 8 is a diagram showing a network configuration in which an IP network 1 and an ATM network 2 are connected to each other via a multiplex transmission apparatus 20.

The multiplex transmission apparatus 20 according to the present embodiment loads an ATM cell 4 with an IP packet 3 transmitted from the IP network 1, and transmits the ATM cell 4 to the ATM network 2.

As shown in FIG. 8, the multiplex transmission apparatus 20 according to the present embodiment includes an IP packet receiver 21, a CPS packet generator 22, a QoS distributor 23, a buffer 24, a priority discard controller 25, a QoS controller 26, an ATM cell generator 27, and an ATM cell transmitter 28.

The IP packet receiver 21 is connected to the CPS packet generator 22. The IP packet receiver 21 receives the IP packet 3 transmitted from the IP network 1, and transfers the received IP packet 3 to the CPS packet generator 22.

The CPS packet generator 22 is connected to the IP packet receiver 21 and the ATM cell generator 27. The CPS packet generator 22 refers to the table shown in FIG. 4, and generates a CPS packet based on an IP packet 3 transferred from the IP packet receiver 21, and then transmits the generated CPS packet to the ATM cell generator 27.

In other words, the CPS packet generator 22 is an intermediately generated packet generator implemented, depending on first header information (DSCP) of the IP packet 3, to generate an intermediately generated packet (CPS packet) having second leader information (CID).

The ATM cell generator 27 is connected to the CPS packet generator 22 and the QoS distributor 23. The ATM cell generator 27 determines a "VCI (third header information)" based on the "CID" set in the CPS packet transmitted from the CPS packet generator 22, generates an ATM cell 4 by using the determined "VCI," and transmits the generated ATM cell 4 to the QoS distributor 23.

The ATM cell generator 27 refers to a table that associates the "CID" with the "VCI" when determining the "VCI." An example of the table is shown in FIG. 9.

FIG. 10 shows an example of a configuration of an ATM cell 4 generated by the ATM cell generator 27.

A "GFC (Generic Flow Control)" field has 4 bits, and indicates flow control information for preventing cell collision in a user-network interface (UNI).

A "VPI" field has 8 bits, and indicates identification information for identifying a VP (Virtual Path). A "VCI" field has 16 bits, and indicates identification information for identifying a VC (Virtual Channel).

A "PT (Payload Type)" field has 3 bits, and indicates an information kind included in an ATM cell payload.

A "CLP" field has 1 bit, and indicates an ATM cell to be discarded preferentially at the time of congestion in the ATM network. An "HEC" field is an error correction field having 8 bits.

To be more specific, the ATM cell generator 27 determines a "CLP (fourth header information)" corresponding to the "CID" of the CPS packet transmitted from the CPS packet generator 22.

When determining the "CLP," the ATM cell generator 27 refers to a table that associates the "CID" with the "CLP." An example of the table is shown in FIG. 11.

The ATM cell generator 27 sets the determined "CLP" and generates an ATM cell 4.

In other words, the ATM cell generator 27 is ATM cell generator implemented to load the ATM cell 4 with the intermediately generated packet (CPS packet).

The ATM cell generator 27 generates an ATM cell 4 by loading an ATM cell payload with one CPS packet. Furthermore, the ATM cell generator 27 can also generate an ATM cell 4 by loading an ATM cell payload collectively with CPS packets having the same "CID."

The QoS distributor 23 is connected to the ATM cell generator 27 and the buffer 24. The QoS distributor 23 determines a "QoS class" based on the "VCI" set in the ATM cell generated by the ATM cell generator 27, and distributes the ATM cell among buffers $24_1$ to $24_n$ respectively prepared for "QoS classes", based on the determined "QoS class."

When determining the "QoS class," the QoS distributor 23 refers to a table that associates the "VCI" with the "QoS class." An example of the table is shown in FIG. 9.

In other words, the QoS distributor 23 is buffer storage implemented, depending on the third header information (VCI), to store the ATM cell 4 in one of a plurality of buffers $24_1$ to $24_n$.

The buffer 24 is connected to the QoS distributor 23, the priority discard controller 25, the QoS controller 26 and the ATM cell transmitter 28. The buffer 24 is a transmission waiting buffer including buffers $24_1$ to $24_n$ for storing ATM cells 4 of respective "QoS classes."

For example, the buffer $24_1$ stores an ATM cell 4 having a "QoS class" of "1" distributed by the QoS controller 23.

The priority discard controller 25 is connected to the buffer 24. The priority discard controller 25 monitors the number of ATM cells 4 stored in the buffers $24_1$ to $24_n$. When the number of ATM cells 4 has exceeded a threshold, the priority discard controller 25 effects a control so as to preferentially discard ATM cells 4 stored in the pertinent buffer included in the buffers $24_1$ to $24_n$.

The priority discard controller 25 can set a different threshold for each "CLP" of the ATM cell 4.

For example, when the number of ATM cells stored in the buffer $24_1$ has exceeded "10," the priority discard controller 25 conducts a discard control so as to preferentially discard ATM cells 4 in which the "CLP" is "0."

Furthermore, when the number of ATM cells 4 stored in the buffer $24_1$ exceeds "20," the priority discard controller 25 conducts a discard control so as to preferentially discard ATM cells 4 in which the "CLP" is "0" and ATM cells 4 in which the "CLP" is "1."

In other words, the priority discard controller 25 is discarder implemented, as an amount of ATM cells 4 stored in the buffers $24_1$ to $24_n$ exceeds a predetermined amount (a threshold concerning the number of packets), to conduct a discard control on ATM cells 4 depending on the fourth header information (CLP) of the ATM cells 4.

The QoS controller 26 is connected to the buffer 24. The QoS controller 26, in an order according to QoS conditions that are set by using the "QoS classes" respectively associated with the buffers $24_1$ to $24_n$, extracts ATM cells 4 from the buffers $24_1$ to $24_n$ into the ATM cell transmitter 28.

The order in which the QoS controller 26 extracts the ATM cells 4 may correspond to the order of priority set every "QoS class" or may be subject to scheduling control conducted so as to secure a communication bandwidth set for each "QoS class."

In other words, the QoS controller 26 is extractor implemented, depending on the QoS class, to extract ATM cells 4 from the buffers $24_1$ to $24_n$.

The ATM cell transmitter 28 is connected to the buffer 24. The ATM cell transmitter 28 transfers an ATM cell 4 extracted from the buffer 24, to the ATM network 2 on the VC connection.

In other words, the ATM cell transmitter 28 is ATM cell transmitter implemented to transmit the ATM cell 4 extracted, to the ATM network 2.

(Operation of Multiplex Transmission Apparatus According to Second Embodiment)

Figure 12:
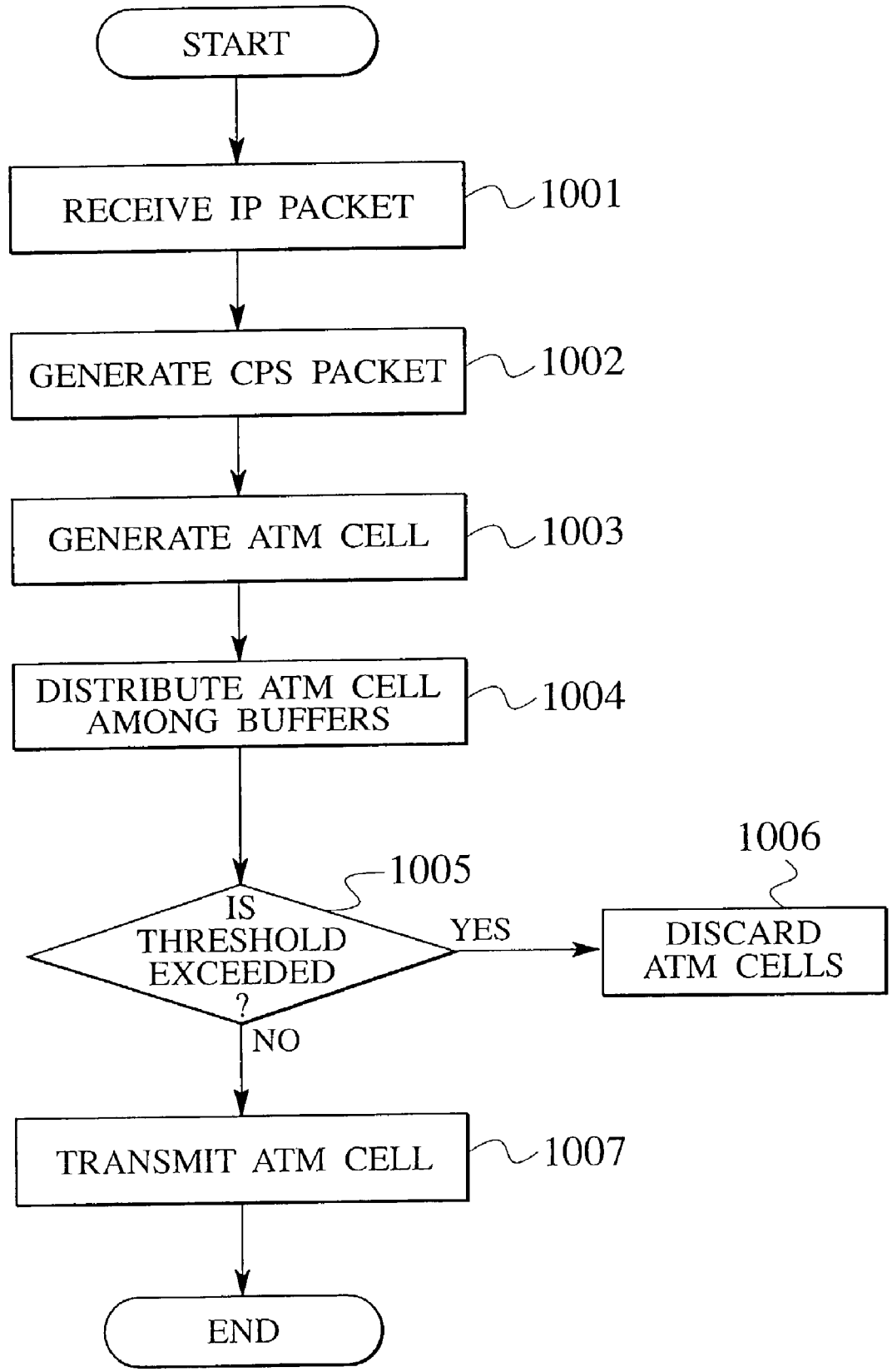
FIG. 12 is a flow chart showing an operation conducted when a multiplex transmission apparatus according to an embodiment of the present invention transfers an IP packet transmitted from an IP network, to an ATM network.

Operation of the multiplex transmission apparatus 20 having the above described configuration will now be described with reference to FIG. 12. FIG. 12 is a flow chart showing an operation conducted when the multiplex transmission apparatus 20 transfers an IP packet transmitted from the IP network 1, to the ATM network 2.

As shown in FIG. 12, the IP packet receiver 21 receives an IP packet 3 transmitted from the IP network 1 at step 1001.

At step 1002, the CPS packet generator 22 refers to the table shown in FIG. 4 based on a "DSCP" set in the "service type" field of the IP packet 3, and generates a CPS packet having a "CID" corresponding to the "DSCP" set in its "CID" field.

At step 1003, the ATM cell generator 27 refers to the table shown in FIG. 9, determines a "VCI" based on the "CID" set in the CPS packet transmitted from the CPS packet generator 22, and generates an ATM cell 4 by using the determined "VCI."

The ATM cell generator 27 determines a "discard priority" corresponding to the "CID" of the CPS packet transmitted from the CPS packet generator 22. And the ATM cell generator 27 determines a "CLP" according to the determined "discard priority," sets the determined "CLP," and generates an ATM cell 4.

At step 1004, the QoS distributor 23 refers to the table shown in FIG. 9 based on the "VCI" set in the ATM cell generated by the ATM cell generator 27, and determines a "QoS class" corresponding to the "VCI." Depending on the determined "QoS class," the QoS distributor 23 distributes the ATM cell 4 among the buffers $24_1$ to $24_n$ prepared for respective "QoS classes."

At step 1005, the priority discard controller 25 effects monitoring to determine, when the ATM cell 4 is distributed among the buffers $24_1$ to $24_n$, whether the number of ATM cells 4 exceeds a threshold corresponding to each "CLP", for each of the buffers $24_1$ to $24_n$.

If as a result of this monitoring the number of the ATM cells 4 is judged to have exceeded the threshold, then at step 1006, the priority discard controller 25 preferentially discards ATM cells 4 having a "CLP" equivalent to "0" stored in the pertinent buffer included in the buffers $24_1$ to $24_n$.

If the number of the ATM cells 4 is judged not to have exceeded the threshold, then the QoS controller 26, in an order according to QoS conditions that are set by using the "QoS classes" respectively associated with the buffers $24_1$ to $24_n$, extracts ATM cells from the buffers $24_1$ to $24_n$ into the ATM cell transmitter 28.

At step 1007, the ATM cell transmitter 28 transfers the ATM cell 4 extracted from the buffer 24, to the ATM network 2 on the VC connection.

(Action and Effects of Multiplex Transmission Apparatus According to Second Embodiment)

According to the multiplex transmission apparatus of the second embodiment, the CPS packet generator 22 generates, depending on the "DSCP" (first header information) of the IP packet 3, a CPS packet (intermediately generated packet) having a different "CID" (second header information). The ATM cell generator 27 loads an ATM cell 4 with the generated CPS packet (intermediately generated packet). In the ATM network 2, therefore, it is possible to conduct a traffic control according to the QoS condition set in the IP packet 3.

Furthermore, according to the multiplex transmission apparatus of the second embodiment, the priority discard controller 25 conducts a discard control according to the "CLP" (fourth header information) generated based on the "DSCP" (first header information) of the IP packet 3. In the ATM network 2, therefore, it is possible to conduct a discard priority control according to the QoS condition set in the IP packet 3.

Furthermore, according to the multiplex transmission apparatus according to the second embodiment, the ATM cell generator 27 loads an ATM cell 4 with one CPS packet (intermediately generated packet). Therefore, it is possible to prevent a delay caused by generating the ATM cell 4.

Furthermore, according to the multiplex transmission apparatus according to the second embodiment, the ATM cell generator 27 loads one ATM cell 4 with CPS packets (intermediately generated packets) having the same "CID" (second header information). Therefore, it is possible to discard CPS packets having the same discard priority when discarding an ATM cell 4.

Furthermore, according to the multiplex transmission apparatus according to the second embodiment, the QoS class management and the discard priority control are conducted at the ATM cell level. Therefore, it is not necessary to conduct the QoS class management and the discard priority control using the AAL2 system.

As heretofore described, according to the present invention, it becomes possible to provide a multiplex transmission apparatus and a multiplex transmission method that make it possible to conduct a traffic control and discard priority control corresponding to the Diffserv system when transferring IP packets 3 having a plurality of QoS conditions set therein, in the ATM network 2.

Heretofore, the present invention has been described in detail with reference to a plurality of embodiments. It will be evident to those skilled in the art that the present invention is not limited to the embodiments described herein. The apparatus of the present invention can be implemented as modified and changed modes without departing from the spirit and scope of the present invention defined by the statements of claims. Therefore, statements in the present application aim at illustration and description, and do not restrict the present invention in any sense.

What is claimed is:

1. A multiplex transmission apparatus configured to load an ATM cell with an IP packet and transmit the ATM cell to an ATM network, the multiplex transmission apparatus comprising:

an intermediately generated packet generator configured to generate, depending on DiffServ Code Point (DSCP) header information of the IP packet, an intermediately generated packet having Channel Identifier (CID) header information;

a buffer storage configured to select, from a plurality of transmission waiting buffers, a transmission waiting buffer which is prepared for a QoS class associated with the CID header information of the intermediately generated packet, and to store the intermediately generated packet in the selected transmission waiting buffer;

an extractor configured to extract, the intermediately generated packet from the selected transmission waiting buffer in an order according to the QoS class among the plurality of transmission waiting buffers; and an ATM cell transmitter configured to load the ATM cell with the intermediately generated packet extracted from the selected transmission waiting buffer and transmit the ATM cell to the ATM network.

2. The multiplex transmission apparatus according to claim 1, comprising a discarder configured, as an amount of the intermediately generated packets stored in the transmission waiting buffer exceeds a predetermined amount, to conduct a discard control on the intermediately generated packets depending on the CD header information.

3. A multiplex transmission apparatus configured to load an ATM cell with an IP packet and transmit the ATM cell to an ATM network, the multiplex transmission apparatus comprising:

an intermediately generated packet generator configured to generate, depending on DiffServ Code Point (DSCP) header information of the IP packet, an intermediately generated packet having Channel Identifier (CID) header information;

an ATM cell generator configured to load the ATM cell with the intermediately generated packet;

a buffer storage configured to select, from a plurality of transmission waiting buffers, a transmission waiting buffer which is prepared for a QoS class associated with Virtual Channel Identifier (VCI) header information of the ATM cell, and to store the ATM cell in the selected transmission waiting buffer;

an extractor configured to extract, the ATM cell from the selected transmission waiting buffer in an order according to the QoS class among the plurality of transmission waiting buffers; and an ATM cell transmitter configured to transmit the ATM cell extracted from the selected transmission waiting buffer, to the ATM network.

4. The multiplex transmission apparatus according to claim 3, comprising a discarder configured, as an amount of the ATM cells stored in the transmission waiting buffer exceeds a predetermined amount, to conduct a discard control on the ATM cells depending on Cell Loss Priority (CLP) header information of the ATM cell.

5. The multiplex transmission apparatus according to claim 3, wherein the ATM cell generator loads the ATM cell with one intermediately generated packet.

6. The multiplex transmission apparatus according to claim 3, wherein the ATM cell generator loads the ATM cell with the intermediately generated packets having the same CID header information.

7. A multiplex transmission method of loading an ATM cell with an IP packet and transmitting the ATM cell to an ATM network, comprising the steps of:

A) generating, depending on DiffServ Code Point (DSCP) header information of the IP packet, an intermediately generated packet having Channel Identifier (CID) header information;

B) selecting, from a plurality of transmission waiting buffers, a transmission waiting buffer which is prepared for a QoS class associated with the CID header information of the intermediately generated packet, and storing the intermediately generated packet in the selected transmission waiting buffer;

C) extracting, the intermediately generated packet from the selected transmission waiting buffer in an order according to the QoS class among the plurality of transmission waiting buffers; and D) loading the ATM cell with the extracted intermediately generated packet extracted from the selected transmission waiting buffer and transmitting the ATM cell to the ATM network.

8. The multiplex transmission method according to claim 7, comprising the step of:

E) conducting a discard control on the intermediately generated packets depending on the CID header information, as an amount of the intermediately generated packets stored in the transmission waiting buffer exceeds a predetermined amount.

9. A multiplex transmission method of loading an ATM cell with an IP packet and transmitting the ATM cell to an ATM network, comprising the steps of:

A) generating, depending on DiffServ Code Point (DSCP) header information of the IP packet, an intermediately generated packet having Channel Identifier (CID) header information;

B) loading the ATM cell with the intermediately generated packet;

C) selecting, from a plurality of transmission waiting buffers, a transmission waiting buffer which is prepared for a QoS class associated with Virtual Channel Identifier (VCI) header information of the ATM cell, and storing the ATM cell in the selected transmission waiting buffer;

D) extracting, the ATM cell from the selected transmission waiting buffer in an order according to the QoS class among the plurality of transmission waiting buffers; and E) transmitting the extracted ATM cell extracted from the selected transmission waiting buffer to the ATM network.

10. The multiplex transmission method according to claim 9, comprising the step of:

F) conducting a discard control on the ATM cells depending on Cell Loss Priority (CLP) header information of the ATM cell, as an amount of the ATM cells stored in the transmission waiting buffer exceeds a predetermined amount.

11. The multiplex transmission method according to claim 9, wherein, in the step B), the ATM cell is loaded with one intermediately generated packet.

12. The multiplex transmission method according to claim 9, wherein, in the step B), the ATM cell is loaded with the intermediately generated packets having the same CID header information.

13. The multiplex transmission apparatus according to claim 1, wherein the ATM cell transmitter is configured to load the ATM cell with the intermediately generated packet extracted from the selected transmission waiting buffer and transmit the ATM cell to the ATM network, the ATM cell being multiplexed onto a single VC connection.

* * * * *